June 22, 1948.    W. E. LARGE ET AL    2,443,660
ELECTRONIC TIMER
Filed May 19, 1945
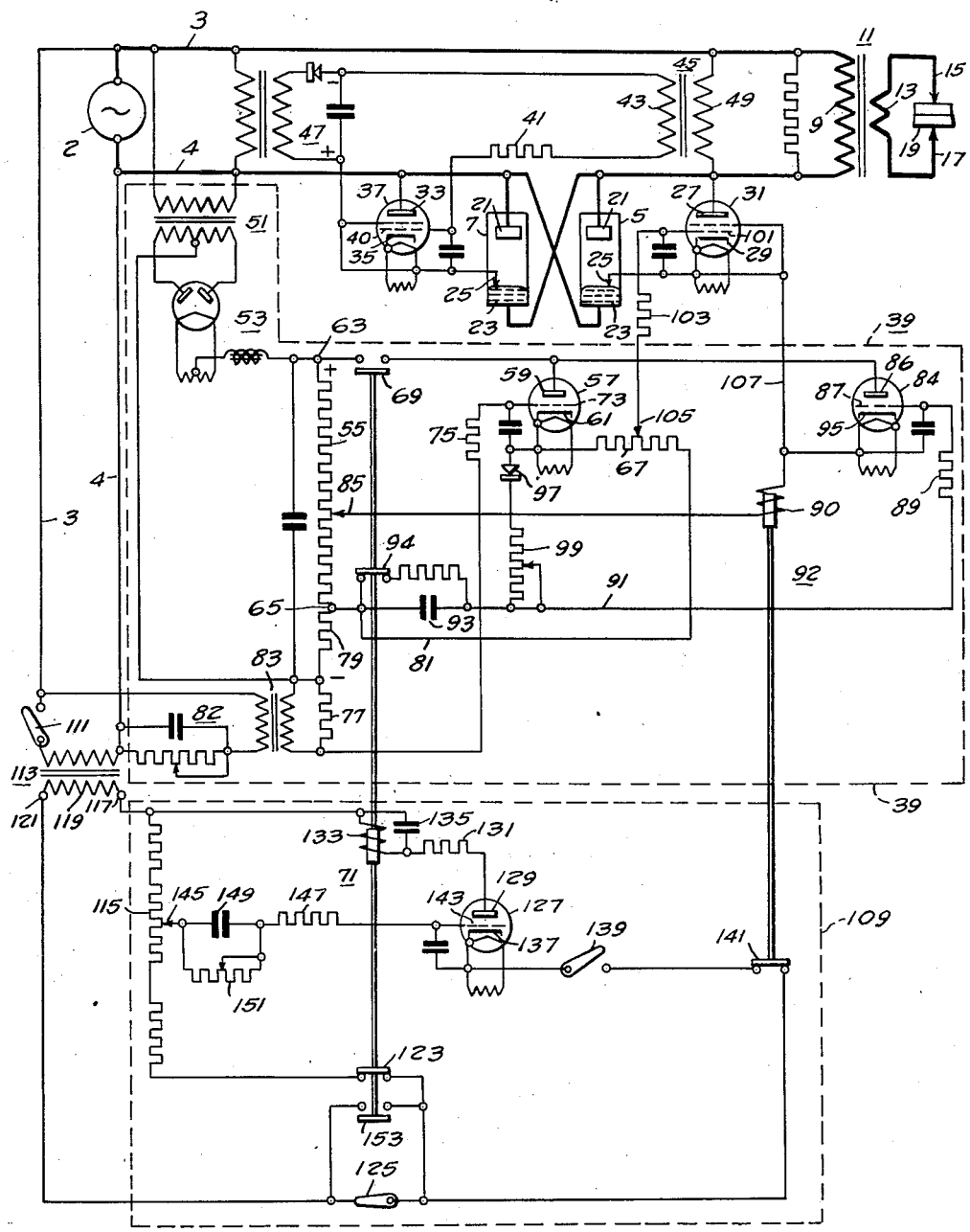
WITNESSES:
E. A. M'Closkey
John R. Shipman
INVENTORS
William E. Large and
Wilbur R. Morton.
BY
F. W. Lyle.
ATTORNEY Patented June 22, 1948

2,443,660

UNITED STATES PATENT OFFICE 2,443,660

ELECTRONIC TIMER

William E. Large, Pittsburgh, Pa., and Wilbur R. Morton, Oak Ridge, Tenn., assignors to Westinghouse Electric Corporation, East Pittsburgh, Pa., a corporation of Pennsylvania Application May 19, 1945, Serial No. 594,766

5 Claims. (Cl. 250—27)

This invention relates to a timing system and has particular relation to an electronic timing system for use with welding apparatus.

In resistance spot welding, good quality welds may be obtained by a method known as pulsation welding. A typical control system for pulsation welding is shown in the Pearson and Stadum Patent No. 2,340,077, issued January 25, 1944, and assigned to the Westinghouse Electric & Manufacturing Company. In this system, discrete impulses of current are supplied to the materials to be welded through a pair of inversely connected electric discharge valves of the arc-like type, such as ignitrons, from an alternating voltage source. Each of the current impulses is of a predetermined length, and there is a predetermined time interval between successive impulses. Since the end of a welding current impulse coincides with the end of a half period of the alternating voltage because of the well-known characteristics of the ignitrons, it is necessary to initiate a welding current impulse in synchronism with the alternating voltage to maintain the product of welding current and time substantially constant to produce uniform welds of good quality.

While the apparatus described in the Pearson and Stadum patent operates satisfactorily, it is highly desirable from the standpoint of both the initial cost and the cost of maintenance to reduce the number of elements in the system and simplify the construction and operation. It is, accordingly, an object of our invention to provide a new and improved pulsation timing system.

Another object of our invention is to provide a novel timing system for a pulsation welding control which has a simplified construction and operation.

A further object of our invention is to provide a new and improved system for supplying power from a periodically pulsating source to a load in discrete impulses, each impulse being of a predetermined length with a predetermined time interval between successive impulses.

More specifically, it is an object of our invention to provide a new and improved spot welding pulsation control system for synchronous operation from an alternating-current source, which system employs a minimum number of electrical elements.

In accordance with our invention, we provide timing apparatus which includes a first timing system, hereinafter referred to as the on-time timing system, for measuring the interval of current flow. A second timing system, referred to hereinafter as an off-time timing system, is provided for measuring the interval between successive impulses of welding current. The on-time timing system is quite similar to that disclosed in the aforesaid Pearson and Stadum patent, but a new and greatly simplified off-time timing system is employed.

The novel features that we consider characteristic of our invention are set forth with particularity in the appended claims. The invention itself, however, both as to its organization and its method of operation, together with additional objects and advantages thereof, may best be understood from the following description of a specific embodiment when read in connection with the accompanying drawing, the single figure of which is a schematic circuit diagram of a preferred embodiment of our invention.

As illustrated in the drawing, current is supplied from a source of alternating current 2 through supply lines 3 and 4 and a pair of ignitrons 5 and 7 connected in anti-parallel, to the primary 9 of the welding transformer 11. The secondary 13 of the welding transformer is connected across the electrodes 15 and 17 in engagement with the material 19 to be welded.

Each of the ignitrons 5 and 7 includes an anode 21, a mercury pool cathode 23 and an igniter 25 in contact with the cathode. The ignition circuit for one of the ignitrons 5 may be traced from supply line 3 through the primary 9 of the transformer 11, the anode 27 and cathode 29 of an electric discharge valve 31 and the igniter 25 and cathode 23 of the ignitron 5 to the other supply line 4. The ignition circuit of the other ignitron 7 may be traced from supply line 4 through the anode 33 and cathode 35 of another electric discharge valve 37, the igniter 25 and cathode 23 of the ignitron 7 and primary 9 to the supply line 3. The electric discharge valves 31 and 37 in the ignition circuits of the ignitrons 5 and 7 are of the arc-like type, such as thyratrons, and are hereinafter referred to as the firing tubes.

The firing tube 31 for the first ignitron 5 is controlled by an on-time timing system 39. The control circuit of the firing tube 37 for the second ignitron 7 may be traced from the grid 40 through a grid resistor 41, the secondary 43 of an auxiliary transformer 45, a biasing potential source 47, to the cathode 35. The primary 49 of the auxiliary transformer 45 is connected directly across the primary 9 of the welding transformer.

The arrangement described for control of the firing tube 37 for the second ignitron 7 is known as a follow-up system. The first ignitron 5 is rendered conductive initially and when it ceases to conduct, the reactance of the welding transformer primary 9 acts through the auxiliary transformer 45 to cause a potential impulse in the control circuit of the firing tube 37 to render the firing tube conductive. As a result, the second ignitron 7 is rendered conductive.

The on-time timing system 39 is energized from the supply lines 3 and 4 by means of an auxiliary transformer 51 and a rectifying system 53 which impresses a direct-current potential across a voltage divider 55. An electric discharge valve 57 of the arc-like type, such as a thyratron which is hereinafter referred to as a start valve, has its anode 59 arranged to be connected to the positive terminal 63 of the voltage divider 55 upon closure of normally open contacts 69 of a relay 71. The cathode 61 of the start valve is connected to an intermediate tap 65 near the negative end of the divider 55 through a resistor 67.

The control circuit of the start valve 57 may be traced from the grid 73 through a grid resistor 75, a second resistor 77, the lower portion 79 of the voltage divider 55, a conductor 81 and resistor 67 to the cathode 61. The potential across the lower portion 79 of the divider tends to maintain the start valve 57 non-conductive after the contacts 69 of the relay 71 are closed. However, a potential impulse is impressed across the resistor 77 in the control circuit from the supply lines through a phase-shifting circuit 82 and an impulsing transformer 83. This potential impulse counteracts the biasing potential of the lower portion 79 of the divider to render the start valve conductive. The phase-shifting circuit 82 is preferably so adjusted with respect to the power factor that the start valve 57 becomes conductive at the beginning of a half period of the alternating current in which the anode 27 of the firing tube 31 is positive.

An electric discharge valve 84 of the arc-like type, such as a thyratron which is hereinafter referred to as a stop valve, has its anode 86 arranged to be connected to the positive terminal 63 of the voltage divider 55 upon closure of the contacts 69. The cathode 95 of the stop valve is connected to the intermediate tap 85 of the divider through the energizing coil 90 of a relay 92.

The control circuit of the stop valve 84 extends from the grid 87 through a grid resistor 89, a conductor 91, a capacitor 93, to the lower intermediate tap 65 of the divider. The control circuit continues from the intermediate tap 85 through coil 90 to the cathode 95 of the stop valve. The capacitor 93 is also connected in series with the start valve 57 through a rectifier 97 and a timing potentiometer 9. A discharge circuit is provided across the capacitor 93 through an originally closed contact 94 of relay 71. This contact 94 is opened when contacts 69 are closed.

When the start valve 57 becomes conductive, the capacitor 93 is charged at a rate which is determined by the setting of the potentiometer 99. The portion of the voltage divider in the control circuit of the stop valve 84 tends to maintain it non-conductive, but after a predetermined interval of time, the capacitor 93 is charged to a sufficient potential to counteract the biasing potential of the divider and render the stop valve conductive.

The control circuit of the firing tube 31 for the first ignitron 5 may be traced from the control grid 101 through the grid resistor 103, an intermediate tap 105 on the resistor 67 in the start valve circuit, conductor 81, the lower intermediate tap 65 on the divider 55, another intermediate tap 85 on the divider, coil 90, and conductor 107 to the cathode 29 of the firing tube. It is then apparent that when the start valve 57 is non-conductive, the grid 101 of the firing tube 31 is negative with respect to the cathode 29. However, when the start tube 57 becomes conductive, the intermediate tap 105 on the resistor 67 in series therewith and, therefore, the grid 101 of the firing tube 31, becomes positive with respect to the cathode 29. When the stop valve 84 becomes conductive, the cathode 29 of firing tube 31 is connected therethrough to the positive terminal 63 of the divider 55 and the grid 101 again is negative with respect to the cathode 29 to prevent the firing tube 31 from being rendered conductive.

The operation of the relay 71 is controlled by the off-time timing system, indicated generally at 109. Power is supplied to the off-time timing system from the supply lines through a switch 111 and an auxiliary transformer 113. A voltage divider 115 is connected from one terminal 117 of the secondary winding 119 of the auxiliary transformer 113 to the other terminal 121 through an originally closed contact 123 of the relay 71 and an originally closed switch 125. An electric discharge valve 127 of the arc-like type, preferably a thyratron, has its anode 129 connected to one terminal 117 of the secondary winding 119 through a resistor 131 and the energizing coil 133 of the relay 71. A capacitor 135 is connected in shunt across the energizing coil 133 of the relay 71. The cathode 137 of the control valve 127 is connected to the other terminal 121 of the secondary winding 119 through an originally open switch 139, the normally closed contacts 141 of the relay 92 in the on-time timing system and the originally closed hand switch 125. The control grid 143 of the valve 127 is connected to an intermediate point 145 on the voltage divider 115 through a grid resistor 147 and a capacitor 149. A resistance element 151 is connected in shunt across the capacitor 149. The originally open contacts 153 of the control relay 71 are connected in shunt across the originally closed hand switch 125.

To operate the control, the hand switch 111 between the source and the auxiliary transformer 113 is first closed. As a result, the voltage divider 115 is energized, but no current flows through the control valve 127 because of the originally open switch 139 in the circuit connecting the cathode 137 to the secondardy winding 119. This originally open switch 139 is thereafter closed. As the control grid 143 is connected to the intermediate point 145 on the voltage divider 115, a grid-cathode voltage more positive than the critical value necessary to render the control valve 127 conductive is supplied from the divider 115 in a half period of the alternating voltage in which the anode 129 of value 127 is positive, such half-period, sometimes being referred to as a positive half-period.

When the control valve 127 becomes conductive in a half period, the control relay 71 is energized. The capacitor 135 in shunt with the energizing coil 133 of the control relay 71 is of such size that the relay is maintained in an energized state so long as the control valve is rendered conductive in successive half periods of the same polarity.

When the relay 71 is energized, the first contact 69 thereof completes the anode circuit of the start and stop valves 57 and 84; the second contacts 94 open the discharge circuit across the on-time capacitor 93; the third contacts 123 open the connection between the divider 115 and the terminal 121 of the secondary winding 119 of the auxiliary transformer 113 to which the cathode 137 of the control valve 127 is connected; the fourth contacts 153 close the shunt circuit across the originally closed hand switch 125.

When the first contacts 69 of the control relay 71 close, the start valve 57 of the on-time timing system is rendered conductive at the beginning of the next half period of the alternating current in which the anode 27 of firing tube 31 is positive by the impulse supplied through the phase-shifting circuit 82. As a result, the firing tube 31 of the first ignitron 5 becomes conductive to render that ignitron conductive. The follow-up system causes the second ignitron 7 to conduct current during the succeeding half period of the alternating voltage. The ignitrons 5 and 7 thus conduct current in alternate half periods until the stop valve 84 becomes conductive at a predetermined later time. When the stop valve 84 becomes conductive, the grid 101 of the firing tube 31 for the first ignitron 5 becomes negative with respect to its cathode 29, and, consequently, the first ignitron 5 fails to become conductive in the next positive half period.

While the on-time timing system is measuring the predetermined time interval, the capacitor 149 in the off-time timing system is charged by the grid current of the control valve 127. This grid current flows during half periods of the alternating voltage in which the anode 129 of valve 127 is positive, in a circuit from the terminal 117 of the secondary winding 119 to which the anode 129 is connected, through the upper portion of the divider 115, the capacitor 149, the grid resistor 147, and the grid 143 and cathode 137 of the control valve 127 to the other terminal 121 of the secondary winding 119. Because of the rectifying action of the grid-cathode circuit within the control valve and the high resistance of the resistance element 151, the charge on the capacitor 149 may be gradually increased. It is to be noted that the constants of the charging circuit of the capacitor 149 are preferably arranged so that the capacitor 149 is almost completely charged in the first or the first few periods of the on-time period. However, the resistance element 151 is then of such size that the capacitor 149 is discharged sufficiently in each half period in which the anode 129 is negative that the positive grid-cathode voltage supplied from the secondary winding 119 in the next half period in which the anode 129 is positive is greater than the charge on the capacitor 149 and the control valve 127 is rendered conductive. As previously explained, the relay 71 is maintained in an energized state as long as the valve 127 becomes conductive in successive half periods of the same polarity.

When the stop valve 84 becomes conductive, the relay 92 in circuit therewith is energized, and its contacts 141 open the anode-cathode circuit of the control valve 127. Consequently, current flow through the control valve 127 is halted. The control relay 71 is then deenergized so that its first contacts 69 open the anode circuit of the stop valve 84 to effect deenergization of the relay 92. The contacts 141 of this relay 92 then reclose the anode-cathode circuit of the control valve 127. However, the contacts 123 of the control relay 71 have also reconnected the divider 115 across the secondary winding 119 of the auxiliary transformer 113. Consequently, the grid-cathode voltage of the control valve 127 as supplied from the secondary winding 119 is lowered to a value measured by the location of the intermediate point 145 on the divider 115. The charge on the capacitor 149 is greater than this lowered grid-cathode voltage supplied from the divider 115, and so causes the grid 143 to be negative with respect to the cathode 137. Consequently, the control valve 127 is not rendered conductive in a half period in which its anode 129 is positive when the anode-cathode circuit is reclosed by deenergization of the relay 92 as the stop valve 84 ceases to conduct current. Preferably the potentiometer 99 is adjusted so that the stop valve 84 becomes conductive to open contacts 141 in the half-period in which control valve 127 is not conductive to avoid arcing at the contacts 141.

The capacitor 149 in the off-time timing system thereafter discharges through the high resistance element 151 in shunt therewith at a predetermined rate dependent upon the value of the resistance. After a time interval dependent upon the rate of discharge of the capacitor, the grid 143 of the control valve again becomes positive with respect to its cathode 137 so that the control valve is rendered conductive and a new cycle of operation is initiated.

During the off-time interval while relay 71 is deenergized, contacts 94 of the relay complete the discharge circuit for the capacitor 93 in the on-time timing system to recondition that capacitor for the next cycle of operation.

Thus, current will be supplied to the welding transformer for timed intervals as determined by the rate of charge of capacitor 93 in the on-time timing system, with the time interval between successive on-time intervals of welding current being determined by the rate of discharge of capacitor 149 in the off-time timing system. When it is desired to halt the operation of the control system, the originally closed switch 125 in the anode-cathode circuit of the control valve 127 is opened and allowed to remain open. If this switch 125 is opened during the off-time period, it obviously prevents the control valve 127 from becoming conductive to initiate another on-time period. If the switch 125 is opened during an on-time period, it does not render the control valve 127 immediately non-conductive because the contacts 153 of the control relay 71 have closed a shunt circuit about the switch 125. However, as soon as the on-time period is over, the control relay 71 is deenergized to open the shunt circuit across the switch 125, and further operation of the system is then prevented.

It is to be noted that while the switches 139 and 125 in the anode-cathode circuit of the control valve 127 are shown as hand switches, they may obviously be replaced by relay contacts or other switch means operated from a separate timing circuit or circuits, if desired. Moreover, the switches 139 and 125 may under some circumstances be completely eliminated with the operation of the control being initiated and halted by switches, such as switch 111, in the power supply circuit.

It is also to be understood that while a discharge path having substantial resistance is to be placed in shunt with the capacitor 149, it may not always be necessary to provide a shunt circuit as through resistor 151. For example, the discharge path may be provided by the leakage resistance path of the capacitor itself if such leakage resistance is of the desired magnitude.

Although we have shown and described a specific embodiment of our invention, we are fully aware that many modifications thereof are possible without departing from the spirit of the invention. It is not our intention, therefore, to restrict our invention to the specific embodiment disclosed.

We claim:

1. A timing system comprising a pair of voltage supply lines, an electric discharge valve of the grid controlled type having an anode and a cathode connected in a circuit across said lines, said valves also having a control grid, a capacitor connected to said grid, a control circuit connected to said capacitor and cathode for impressing a control voltage across said connected capacitor and grid and said cathode sufficient to cause said valve to become conductive, a current-responsive device in said anode-cathode circuit operable in response to current of a predetermined value and associated with said control circuit to make said control voltage more positive from said capacitor to cathode, a timer responsive to operation of said device for temporarily preventing current flow in said anode-cathode circuit a predetermined time interval after said device is first operated to cause said device to become inoperative, and a discharge path having substantial resistance in shunt with said capacitor.

2. A timing system comprising a pair of alternating voltage supply lines, a voltage divider connected across said lines, an electric discharge valve of the grid controlled type having an anode and a cathode connected in a circuit supplied from said lines, said valve also having a control grid, a capacitor connected between said grid and an intermediate point on said divider whereby is provided a grid-cathode voltage to cause the valve to be conductive in positive half-periods of said alternating voltage, first switch apparatus interposed in circuit between the divider and one of said lines to which the cathode is connected and operable in response to current in said anode-cathode circuit in successive positive half periods to disconnect the divider from said one line, whereby a grid current through said valve is produced to charge said capacitor, second switch apparatus interposed in the anode-cathode circuit and operable to open that circuit after said last-named means has become operable to prevent said valve from becoming conductive in a positive half-period and then to reclose said anode-cathode circuit, whereby said divider is reconnected to the line to which the cathode is connected, the charge on said capacitor upon said reconnection being sufficient to prevent said valve from being rendered conductive, and a discharge path having a substantial resistance in shunt with said capacitor to effect a discharge thereof at a predetermined rate.

3. A timing system comprising a pair of alternating voltage supply lines, a voltage divider connected across said lines, an electric discharge valve of the grid controlled type having an anode and a cathode connected in a circuit across said lines, said valve also having a control grid, a capacitor connected between said grid and an intermediate point on said divider, whereby said divider supplies a grid-cathode voltage to cause the valve to be conductive in positive half-periods of said alternating voltage, a current-responsive device in said anode-cathode circuit and operable, so long as said valve is conductive in successive positive half-periods, to disconnect the divider from the line to which the cathode is connected, whereby a grid current through the valve is produced to charge said capacitor, timing means including a switch in the anode-cathode circuit for opening that circuit a predetermined time interval after said valve is first conductive to prevent said valve from becoming conductive and then reclosing said anode-cathode circuit, whereby said divider is reconnected to said line to which the cathode is connected, the charge on said capacitor upon said reconnection being sufficient to prevent said valve from being rendered conductive, and a discharge path having substantial resistance in shunt with said capacitor to effect a discharge thereof at a predetermined rate.

4. A timing system comprising a pair of alternating voltage supply lines, a voltage divider connected across said lines, an electric discharge valve of the grid controlled type having an anode and a cathode connected in a circuit across said lines, said valve also having a control grid, a capacitor connected between said grid and an intermediate point on said divider, whereby said divider supplies a grid-cathode voltage to cause the valve to be conductive in positive half-periods of said alternating voltage, a relay device in said anode-cathode circuit operable, so long as said valve is conductive in successive positive half-periods, to disconnect the divider from the line to which the cathode is connected, whereby a grid current through said valve is produced to charge said capacitor, timing means including a switch in the anode-cathode circuit for opening that circuit after a predetermined time interval to prevent said valve from becoming conductive in a positive half-period whereby said relay device is deenergized and said divider end reconnected to said line to which the cathode is connected, said relay device being effective when first energized to initiate operation of said timing means with said timing means effecting reclosure of said anode-cathode circuit after said relay means is deenergized, the charge on said capacitor upon said reconnection being sufficient to prevent said valve from being rendered conductive, and a discharge path having a substantial resistance in shunt with said capacitor to effect a discharge thereof at a predetermined rate.

5. A timing system comprising a pair of voltage supply lines, an electric discharge device of the grid-controlled type having an anode and a cathode connected in a circuit across said lines and also having a control grid, a voltage divider connected across said supply lines, a capacitor connected in circuit from said grid to an intermediate point on said divider, a current responsive device in said anode-cathode circuit operated in response to current of a predetermined value to disconnect the divider from the line to which the cathode is connected, a normally closed switch in said anode-cathode circuit, a timer operatively connected to said switch and operable a predetermined time after said device is first operated for temporarily opening the switch to cause said device to become inoperative and then reclosing the switch, and a discharge path having substantial resistance in shunt with said capacitor.

WILLIAM E. LARGE.
WILBUR R. MORTON.

REFERENCES CITED

The following references are of record in the file of this patent:

UNITED STATES PATENTS

| Number | Name | Date |
|---|---|---|
| 1,867,225 | Levan et al. | July 12, 1932 |
| 2,171,347 | Schneider | Aug. 29, 1939 |
| 2,251,763 | Schoene | Aug. 5, 1941 |
| 2,292,846 | Pritchard | Aug. 11, 1942 |
| 2,306,237 | Wolfner, 2d | Dec. 22, 1942 |
| 2,364,680 | Wolfner, 2d | Dec. 12, 1944 |
| 2,366,060 | Schneider | Dec. 26, 1944 |
| 2,371,981 | Few | Mar. 20, 1945 |